Dec. 15, 1936.  E. T. CROXDALE  2,064,339
POWER MECHANISM
Filed Aug. 10, 1935  2 Sheets-Sheet 1
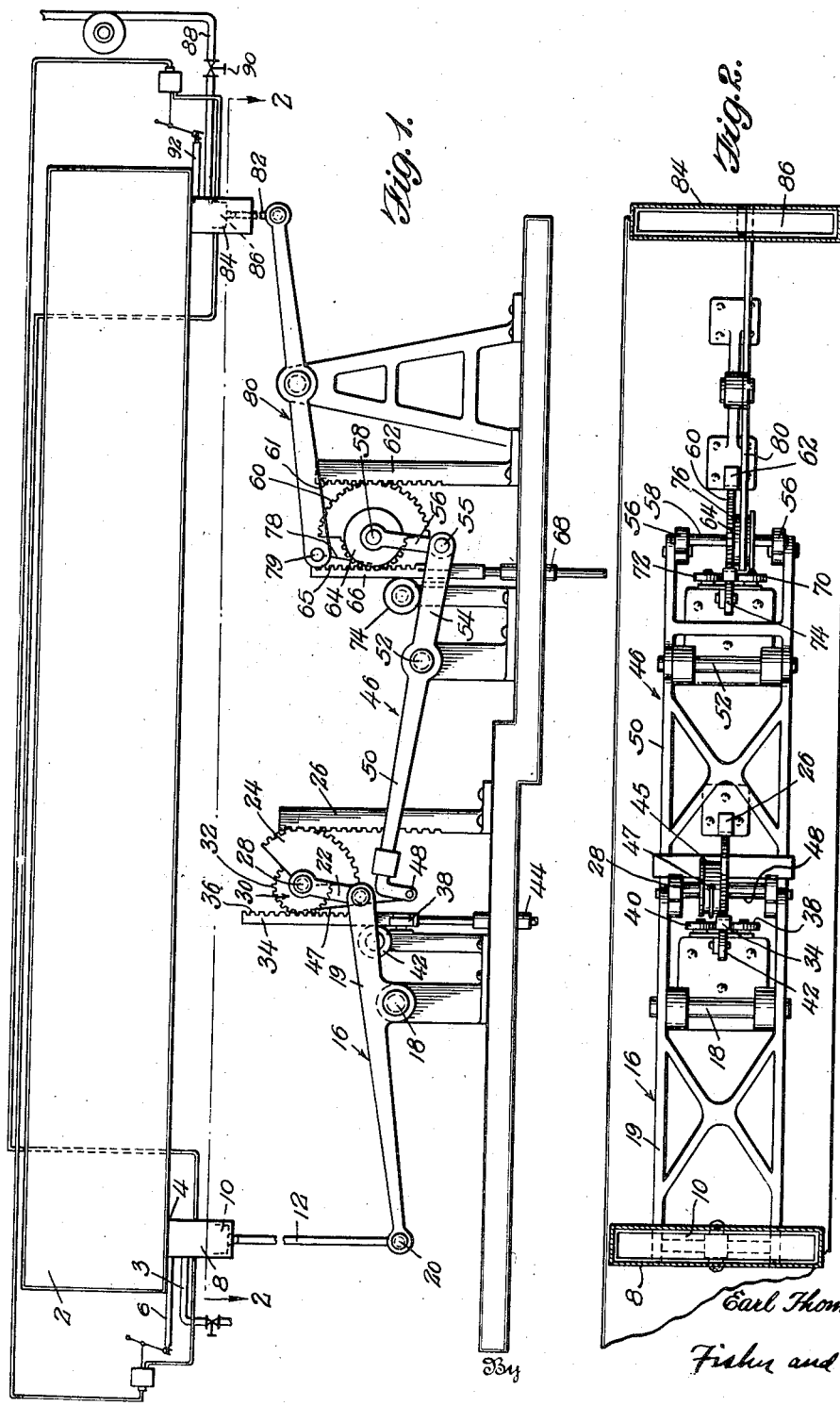
Inventor
Earl Thomas Croxdale
By Fisher and Pedersen
Attorneys Dec. 15, 1936. E. T. CROXDALE 2,064,339
POWER MECHANISM
Filed Aug. 10, 1935 2 Sheets-Sheet 2
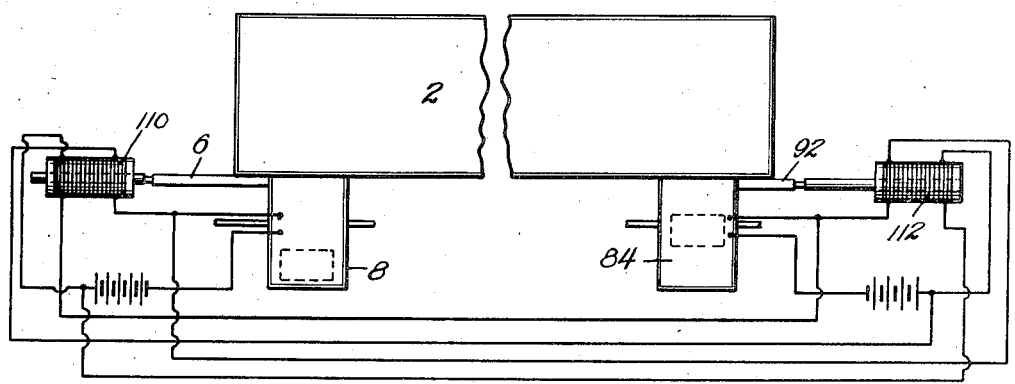
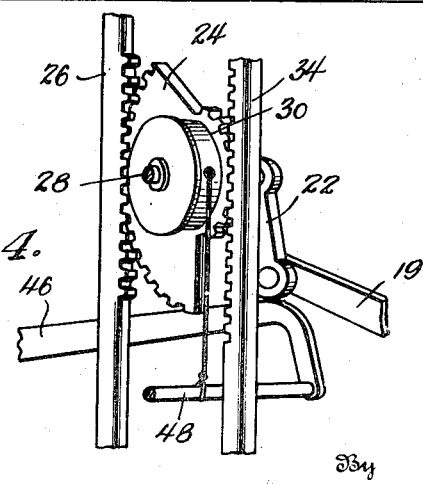
Inventor
Earl Thomas Croxdale,
Fisher and Pedersen
By
Attorney Patented Dec. 15, 1936

2,064,339

UNITED STATES PATENT OFFICE 2,064,339

POWER MECHANISM

Earl Thomas Croxdale, New York, N. Y.

Application August 10, 1935, Serial No. 35,659

2 Claims. (Cl. 74—110)

This invention relates to a mechanism or mechanical movement for the development and transfer of power and more particularly to a mechanical device adapted to be used, for example, in connection with means for the automatic elevation of water for irrigation or water distribution or for the pumping or distribution of oil and similar uses. The invention may also be applied in connection with apparatus for the development of power from gas pressure or in connection with gas distribution and other uses.

The invention is based upon the discovery that power may be readily transmitted by a mechanical device including a stationary element, a movable element and interconnecting means by which the power may be transferred to a movable part and translated through the series of such units to any desired point for utilization.

In the preferred form of the invention, the said stationary element comprises a rack having teeth on its operating surface which are engaged by the teeth on a sprocket member which is mounted on a movable axis. The movable element is also preferably a rack having teeth which engage a second sprocket member which is also mounted on the said axis. By the use of a piston-cylinder unit, for example, to which fluid is applied for the development of power and by the use of a suitable element connecting the piston to the said series of units for operation and also the use of a second piston-cylinder unit connected to the said series of units, the power developed in the first cylinder may be transmitted to the second piston-cylinder unit and utilized in any desired manner, as for elevating liquids and for other uses.

One of the objects of the invention is to provide a device which is adapted for the development and transfer of power by the utilization of a fluid which may be either a liquid or gas for a large variety of uses as will hereinafter appear.

Another object of the invention is to provide a mechanical device which may be applied for the transmission of power and used in a plurality of units as may be advantageous or desired in any particular installation.

The various features of the invention are illustrated in the accompanying drawings, in which:

Fig. 1 is a view in elevation of the preferred form of the invention.

Fig. 2 is a plan view of the device shown in Fig. 1 taken on the section line 2—2 of Fig. 1;

Fig. 3 is an illustration of means for controlling valves in which electrical devices are employed in a circuit for the said operation; and Fig. 4 is a detailed view in perspective showing a modified form of the mechanism of one of the power transmitting units.

Referring more in detail to the drawings, the numeral 2 indicates a reservoir or tank from which liquid may be drawn for the operation of the device. The reservoir may be of any suitable size and it will be understood that a natural body of water as, for example, a pond may be employed if desired, although obviously the invention is more readily applied in connection with a tank or reservoir.

At some point preferably at the bottom of the reservoir, as point 4, is an opening which is preferably controlled by a suitable valve, such as a gate valve 6 which may be operated mechanically or electrically at will. Connected to the opening 4 is a cylinder or pipe 8. Disposed within the cylinder 8 is a piston member 10 which is connected to a piston rod 12, the piston being mounted to slide axially of the cylinder. The piston rod 12 is preferably connected to the piston 10 by means of a pivotal connection 14 such as a ball and socket joint. The connecting rod 12 is connected to a lever 16 having a fixed fulcrum 18, the connecting rod being attached to the arm 17 of the lever by a ball and socket joint or other suitable connection 20, in order to give a free movement in transmitting the power from the piston and connecting rod to the lever.

Connected to the arm 19 of the lever 16 is a pivotally mounted support 22 on which is mounted a toothed wheel 24 which is preferably a section of about 180°. This toothed section meshes with a rack member 26 preferably fixed in position, whereby the wheel section is raised and lowered in its movements of engagement with the teeth on the rack. The said wheel section is preferably arranged on a shaft member 28 upon which is also located a second toothed wheel 30 preferably of smaller diameter than the said wheel 24. The teeth 32 of the wheel or sprocket member 30 engage a movable rack 34 having teeth 36 thereon, the rack being preferably mounted between guide pulleys or wheels 38, 40 and 42, and passing through a bearing member 44, the said wheels and bearing serving to cushion the thrust on the rack member during operation of the device.

Arranged axially with the sprocket member 30 and preferably mounted so as to be integral therewith is a pulley member 45 over which passes a cord or cable member 47 which is connected with the next lever member 46 in the series. The cord member 47 is attached to the lever 46 in any suitable manner as, for example, to a bar member 48 connecting the ends of the arm 50 of lever member 46 which is fulcrumed at the fixed pivot 52.

The lever member 46 is attached in the manner similar to the connections of lever 16, the arm or arms 54 being pivotally connected at 55 to supports 56 carrying a shaft 58 on which is mounted a wheel section or sprocket section 60 which engages with the teeth 61 of a fixed rack member 62 and a sprocket member 64 which engages with the teeth 65 of a movable rack member 66 which is supported in a bearing 68 by pulley members 70, 72 and 74 in a manner similar to that of the movable rack member 34.

Also mounted on the shaft member 58 is a pulley member 76 on which is a cord member 78 which is connected to the lever 80 next in the series for operation in the same manner as has been described in connection with levers 16 and 46. Any desired number of units may be employed in the power transmitting series as may be necessary or desirable in any particular installation. I may, for example, employ two units in a series as illustrated in Figs. 1 and 2 of the drawings or in certain cases I may employ a larger number, such as six units which may be used to advantage.

The last lever 80 in the series is preferably connected to a pivotally mounted rod 82 which is attached to the device to be operated, such as a piston cylinder unit 84, 86 for pumping water or other liquid from a reservoir or other source to a more elevated point such as a reservoir placed at a higher level, for example, or to a turbine or other mechanical device.

In connection with the last named piston cylinder unit is a suitable valve 92 adapted to open and close communication between the tank or source of liquid and the piston cylinder unit 84, 86. An outlet pipe 88 from the cylinder 84 serves to lead off the water or other liquid which is being pumped. A valve 90 is preferably employed in the outlet pipe 88 so that the operation of the device may be controlled as in the usual manner.

The valves for cutting off communication between the piston-cylinder units and the source of supply of fluid may be controlled in any suitable way as will be apparent to those skilled in the art. It will be understood, however, that the pressure on the valves is high and requires a positive control for the movement of the valves at the desired predetermined time.

The gate valve 92 is operated in a similar manner to that of the gate valve 6, to the cylinder 84 through a valved port 87.

The operation of the device may now be described in detail:

Assuming that the piston 10 in the cylinder 8 is at the upper end of its stroke with the gate valve 6 open, the hydrostatic pressure of the liquid in the tank 2 causes the piston 10 to move downwardly, filling the portion of the cylinder above the piston with liquid during the said downward travel. As the piston rod 12 is forced downwardly, the lever 16 is caused to rotate in a counterclockwise direction about the point 18, the arm 19 moving upwardly, so that the arms 22 to which the axle 28, sprockets 24 and 30 and pulley 45 are connected, are moved correspondingly upwardly, causing the sprocket 24 to roll clockwise on the teeth of the stationary rack 26. The sprocket 30 being also turned in a clockwise direction carries the movable rack 34 upwardly through engagement of the teeth 32 on the sprocket with the teeth 36 of the rack. During this upward movement of the rack in the bearing 44, the rack is supported laterally by the guide pulleys 38 and 40, and at the rear by a pulley 42. The pulley member 45 which is fixed on the axle 28 is also moved in a clockwise direction whereby the cord or cable 47 is wound partly around the face of the pulley, shortening the free length of the cord or cable. The cable 47 is attached at the free end to a cross bar 48 at the end of the arm 50 of the lever 46, so that as the cord is pulled upwardly the lever 46 is moved in a clockwise direction about the pivot 52, causing the other arm 54 to move downwardly, whereby the arms 56 of the second power transmitting unit in the series are forced downwardly and the sprocket member 60 rolls downwardly in a counterclockwise direction on the teeth 61 of the stationary rack 62. Through this movement the sprocket member 64 connected to the sprocket 60 also rotates in a counterclockwise direction, whereby the movable rack 66 is forced downwardly in the bearing 68. It will be noted that the rack member 66 is also supported laterally by the guide pulleys 70 and 72 at the sides thereof and pulley 74 at the rear of the rack member, so as to take up any lateral thrust or thrust tending to bend the rack member 66 outwardly from the sprocket member 64. On the shaft 58, a pulley member 76, similar to the pulley 45, carries a cord or cable 78 which, in the counterclockwise rotation of the pulley, is shortened by a partial winding on the pulley, so that the lever 80 next in the series of levers is given a counterclockwise rotation, the cable being attached to the lever at the end 79 thereof. The other end of the lever 80 is connected through a piston rod 82 to the device to be operated, such as a piston 86 in the cylinder 84 so that in the upward movement of the adjacent end of the lever 80 the piston 86 travels upwardly in the cylinder 84 forcing liquid in the cylinder through the pipe 88 to a reservoir at a higher level or to a turbine or other device to be operated.

It is to be noted in connection with the drawings, that the arm 19 of the lever 16 is substantially one-third the length of the lever so that the leverage obtained through the power applied to the piston rod 12 at the other end of the lever is in the ratio of two to one, in accordance with the law of the lever. By the operation of the first power transmitting unit in the series, the movement of the end 19 of the lever 16 is transmitted to the lever 46 so that as the arm 50 of the lever 46 moves upwardly the power is again multiplied at the second unit, the arm 54 being one-half the length of the arm 50 in the lever 46. The second unit in the system then transmits or multiplies the power to the lever 80, which in turn transmits the power to the device to be operated as piston 86 as has been described.

In the application of the device as described, during the upward travel of the piston 86 the gate valve 92 is closed, thereby forcing the liquid in the cylinder out through the pipe 88, as described. After the piston 86 has moved to the upper limit of its stroke so that no more liquid passes to the pipe 88, the check valve 90 closes due to the excess of pressure in the pipe 88 over that in the cylinder 84.

It will be understood that the timing operation of the gate valves may be adjusted so as to obtain operation at the desired intervals so as not to build up pressure unnecessarily in the system.

Referring to Fig. 3 of the drawings, the gate valves 6 and 92 are indicated diagrammatically together with solenoids 110 and 112' which are shown directly attached to the gate valve for operation. It will be understood, however, that in large installations it would be necessary to employ a relay and motor connected to the gate valves so that a solenoid will operate a relay mechanism and will set corresponding motors connected to the gates into operation and break the circuits at the end of the travel when the gate valves have reached the closed position. It is to be understood that such a relay system, motors and connected solenoids and circuits are old in the art and the construction and operation is not, therefore, described in detail, nor claimed herein.

The form of the various elements of the invention may obviously be varied within wide limits to suit any particular installation. I prefer, for example, to employ a cylinder 10 in the form of a rectangle in cross section, together with a piston of corresponding form, although the usual form, circular in cross section, may be used if desired. The various levers and parts may be designed so as to be substantially balanced about the fulcrum thereof, so that when the device is not in operation the various parts are in balance. The various parts may obviously be modified as will be apparent to any person skilled in the art to which this invention relates.

It is to be understood, therefore, that the invention may be modified or changed within the scope of the claims without departing from the spirit or scope of the invention.

Having thus described the invention, what I claim as new is:

1. In a device of the class described a power transferring mechanism comprising the subcombination of a stationary rack element, a movable rack element, a sprocket mounted fixedly on a movable axle and engaging said stationary rack element, a second sprocket member mounted fixedly on said axle and engaging said movable rack element, a movable pulley element connected to the said axle and means for transferring movement from a lever element through said transferring mechanism to another lever element.

2. In a device of the class described a power transferring mechanism comprising in subcombination a lever element, a stationary rack, a movable rack, a movable sprocket mechanism connecting the said stationary rack with the said movable rack, said sprocket mechanism including a sprocket engaging said stationary rack, a sprocket engaging said movable rack, and a pulley member, said sprockets and pulley member being fixed on a movable shaft operatively connected to said lever element, means for transferring movement from the end of said lever to said shaft, a second lever element and means operatively connecting said pulley element with said second lever for transferring movement of the said pulley element thereto.

EARL THOMAS CROXDALE.